May 6, 1941.                D. H. FINKLE                2,240,643
                             SKIN CLAMP
                          Filed Oct. 2, 1940
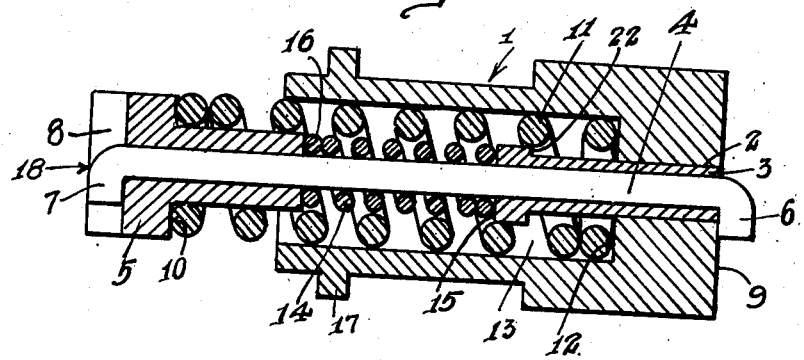
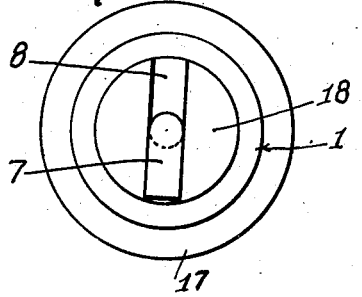
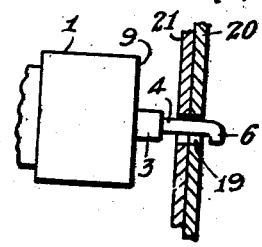
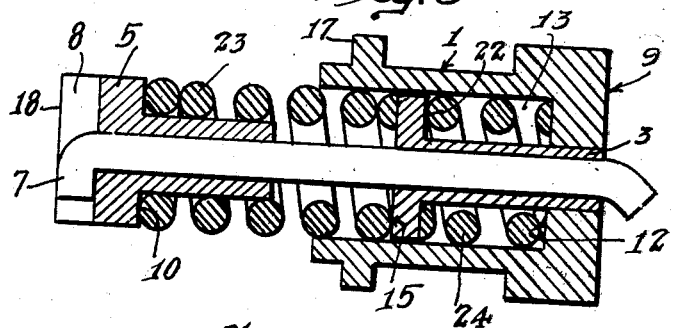
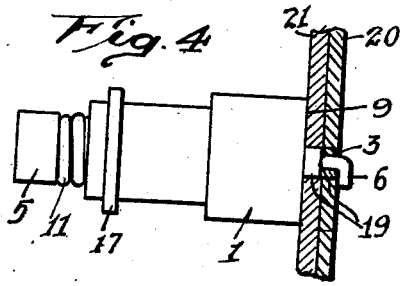
Inventor
Donald H. Finkle
By Lyon & Lyon
Attorneys Patented May 6, 1941

2,240,643

UNITED STATES PATENT OFFICE 2,240,643

SKIN CLAMP

Donald H. Finkle, Los Angeles, Calif.

Application October 2, 1940, Serial No. 359,385

5 Claims. (Cl. 85—5)

My invention relates to a clamp for use in holding two sheets of metal and especially to a clamp for concentrically aligning holes in the two sheets.

In the construction of an airplane fabricated from metal parts or one that has metal skin or covering to the wings or fuselage, the metal skin is placed over structural members and then holes are drilled through the skin and structural members and the rivets placed through the holes. Through the skin of one wing or fuselage, several hundred and sometimes thousands of these rivet holes are necessary and when filled they must all align to permit the rivets to be placed.

There have been several skin clamps invented prior to my invention, the best of which is the one shown in the patent to De Mooy No. 2,159,655. The De Mooy clamp and all other clamps have a projection which is substantially the diameter of the holes to be aligned but one side of this projection has been cut away so as to provide a slot for the operation of the clamping member of the skin clamp. As some of these skin clamps are for use in a hole with a diameter of $\frac{3}{32}$ inch, the cutting away of a portion of this projection seriously weakens the projection and causes excessive wear and breakage. In the place of the projection used in prior clamps, I use a bushing that is composed of a circular tube of substantially the diameter of the hole into which it is to be inserted. This tubular shape reinforces itself and prevents excessive wear and breakage.

A clamp constructed in accordance with my invention has a body member through which is inserted a wire having a hook on the end thereof and actuated by a spring. When the body member is pressed down on the spring, the hook member can be placed through the rivet holes and upon the release of the spring the hook on the wire and the adjacent body member will clamp the body member and skin tightly together. To provide means for concentric alignment of the holes, a bushing of the same diameter as the hole into which the particular clamp is to be placed is slidably mounted in the body member surrounding the wire comprising the hook member. This bushing is spring actuated and, when the clamp is compressed for insertion in a hole, the bushing is extended out through the body member and at the same time the wire hook member is forced outwardly from the end of member is forced outwardly from the end of this bushing. When the compression on the clamp is released, the bushing cannot draw back into the body member further than the hook member and the bushing remains and fills the holes and maintains them in concentric alignment.

It is an object of my invention, therefore, to produce a clamp for use in the fastening of the skin to the body member of an airplane.

Another object of my invention is to produce a clamp which is capable of passing through a rivet hole and maintaining the said rivet hole in concentric alignment and at the same time firmly holding the two parts to be riveted together.

Another object of my invention is to produce a skin clamp which will not be subject to excessive wear and breakage.

Other objects and advantages of my invention will be apparent from the accompanying description of the preferred embodiment of my invention.

Fig. 1 is a longitudinal section.

Fig. 2 is an elevation of the opposite end from the clamping end.

Fig. 3 is a longitudinal section of a modification.

Fig. 4 is an elevation partially in section showing a skin clamp in working position.

Fig. 5 is a view partially in section of the clamping end.

A clamp constructed in accordance with my invention has a body member 1, having a hole 2 for the reception of the bushing 3. A wire rod 4 is inserted through a cap 5 and the bushing 3 and an end 6 bent at right angles. The wire rod has an end 7 bent at right angles and engaging a slot 8 in the cap 5. To maintain tension between the end 6 and a face 9 of the body member 1, and thus clamp materials between them, a spring 11 is provided which presses against a shoulder 10 of the cap 5 and the inner end 12 of the bore 13.

To maintain the clamp in the holes in two pieces of material and align those holes concentrically, the bushing 3, of substantially the diameter of the holes, is made slidable in the hole 2 and when ejected therefrom by the action of a spring 14 substantially fills the holes in the material. The spring 14 engages end 15 of the bushing 3 and end 16 of cap 5. To clamp and align different sized holes in the material to be clamped, a clamp with a bushing 3 substantially the diameter of the hole must be used.

I have found that the only relation between the spring 14 and the spring 11 is that the spring 14 must be shorter and of less power than the spring 11. However, any slight change in power or length of these springs is sufficient to make the clamp operable.

To prevent breakage of the right angle bend at the end 7 of the wire rod by the compressing tool used to operate the clamp, the cap 5 has the slot 8 in which the end 7 is recessed so as to prevent contact with the tool.

The body member 1 has a rib 17 completely encircling it to provide a grip for a compressing tool. Any tool similar to a pair of pliers which can engage a face 18 of the cap 5 and the rib 17 may be used for compressing my clamp.

In the operation of my clamp, a compression tool operating on the rib 17 and cap 5 compresses the springs 11 and 14 forcing out the wire rod 4 and bushing 3 as shown in Fig. 5, thus permitting the insertion of the end 6 through holes 19 in metal plates 20 and 21 and then placing of the bushing 3 in the holes 19. As the bushing 3 has a shoulder 22 thereon, it cannot be completely ejected from the body member 1 and the wire rod 4 may be extended outwardly therefrom as shown in Fig. 5.

The end 6 of the wire rod 4 cannot be of greater length than the diameter of the holes 19 as it would be impossible to insert it therethrough unless the material was very thin.

Because of the close fit between the inside bore of the bushing 3 and the wire rod 4, when the bushing is placed in the holes 19 and the compression tool released, the end 6 will extend beyond the edges of the holes 19 and firmly clamp the metal plates 20 and 21 between itself and the face 9 of the body member 1 as shown in Fig. 4.

As the bushing 3 is tubular in form and substantially filled by the wire rod 4, it is of great strength and there is little chance of breakage, which is common to the partially cut away projection used for the same purpose in the De Mooy Patent No. 2,159,655.

In Fig. 3 a modification of my invention is shown. One difference between this modification and that shown in Fig. 1 is that a spring 23 bears against the end 15 of the bushing 3 and the shoulder 10 of the cap 5 and a second spring 24 is placed between the shoulder 22 and the end 13 of the bore 12. This modification permits the use of identical material for the two springs 23 and 24 and also is much easier to assemble.

I have found a definite proportion in the lengths of the springs 23 and 24 are necessary to proper operation of my clamp. For example, a clamp for use in passing through two sheets of metal having a combined thickness of 1/16 inch must have the spring 23 1 1/8 inch long and the spring 24 11/16 inch long. A variation of 1/32 in the spring 23 is permissible but any variation of the spring 24 will cause the bushing 3 to emerge too far from the body member 1 and thus weaken the grip of the clamp, or not emerge sufficiently to entirely fill the hole. Similarly, the thickness of the body member 1 between the end 12 and the face 9 bears a relationship to the action of the bushing 3. In the example given this thickness should be 1/16 inch.

It will be seen from these figures that the spring 23 must be twice as long as the spring 24. This difference in length provides for sufficient travel of the spring 23 to force the wire rod 4 beyond the end of the bushing 3 so as to allow the insertion of the end 6 through the rivet hole.

It should be noted that both springs 23 and 24 should be of exactly the same diameter of wire and have the same number of coils per inch.

One improvement in my clamp over that formerly used is its ability to be so designed that it may pass through any length of holes and still properly align and clamp. For example, if there is a 1/16 inch hole in the sheets to be clamped, the bushing 3 of the example given above is lengthened so that at all times it extends 9/16 inch beyond the face 9, thus giving the bushing an effective length of 1/16 inch.

In this modification (Fig. 3) the end 6 of the wire rod 4 is not bent at a right angle as in Fig. 1. At substantially the angle shown in Fig. 3, the grip on the metal plates is increased by the wedging action of the end which forces the rod tight against the opposite side of the bushing 3 from which the end 6 is bent.

While I have described the preferred embodiments of my invention, I am not limited to any of the specific forms therein set forth except as described in the appended claims.

I claim:

1. In a clamp for concentrically aligning holes of the same diameter in two or more sheets of metal, a body member, a bushing slidable in said body member of substantially the diameter of said holes to maintain said holes in concentric alignment, a wire rod slidable in said bushing, a hook on said rod, and tension means for securely holding said hook and said body member against opposite sides of the sheets of metal.

2. In a clamp for concentrically aligning holes of the same diameter in two or more sheets of metal, a body member, a bushing slidable in said body member of substantially the diameter of said holes to maintain said holes in concentric alignment, a wire rod slidable in said bushing, a hook on said rod, tension means for securely holding said hook and said body member against opposite sides of the sheets of metal, and means causing said bushing to extend beyond said body member when in clamping position.

3. In a clamp for concentrically aligning holes of the same diameter in two or more sheets of metal, a body member, a bushing slidable in said body member of substantially the diameter of said holes to maintain said holes in concentric alignment, a wire rod slidable in said bushing, a hook on said rod, tension means for securely holding said hook and said body member against opposite sides of the sheets of metal, and a cap on said wire rod having a slot therein to protect the end of said wire rod.

4. In a clamp for concentrically aligning holes of the same diameter in two or more sheets of metal, a body member, a bushing slidable in said body member, a wire rod slidable in said bushing, a hook on the end of said wire rod, tension means for securely holding said hook and said body member against opposite sides of the sheets of metal, a spring for extending said bushing beyond the end of said body member, and a stop on said bushing to permit said wire rod to be extended beyond the end of said bushing, said bushing being of substantially the diameter of said holes to maintain them in concentric alignment.

5. In a clamp for concentrically aligning holes of the same diameter in two or more sheets of metal, a body member, a bushing slidable in said body member, a wire rod slidable in said bushing, a hook on the end of said wire rod, tension means for securely holding said hook and said body member against opposite sides of the sheets of metal, a spring for extending said bushing beyond the end of said body member, a stop on said bushing to permit said wire rod to be extended beyond the end of said bushing, said bushing being of substantially the diameter of said holes to maintain them in concentric alignment, and a cap on said wire rod having a slot therein to protect the end of said wire rod.

DONALD H. FINKLE.